United States Patent Office 3,243,578
Patented Mar. 29, 1966

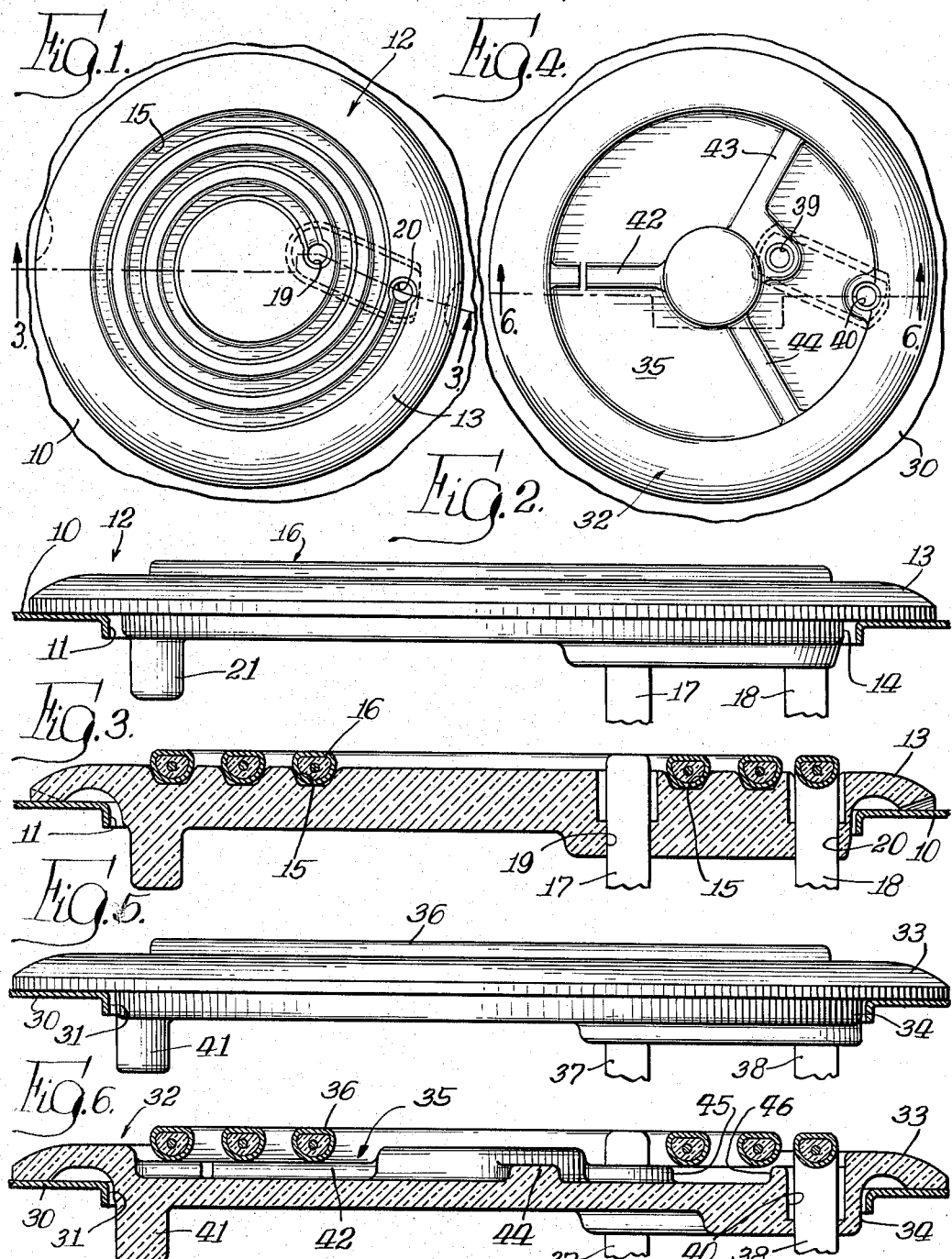

3,243,578
SUPPORT FOR SURFACE UNITS
John A. Sullivan, Clarendon Hills, and Leroy C. Hanson, Elmhurst, Ill., assignors to Ferro Corporation, a corporation of Ohio
Filed Oct. 28, 1963, Ser. No. 319,319
2 Claims. (Cl. 219—467)

This invention relates to electrical heating elements for cook tops and more particularly to a novel form of support for a sheathed electrical heating coil.

It is the general object of the present invention to produce a new and improved support for a heating coil.

In the usual form of cook top, apertures are provided in which the heating coils are to be seated and means in the form of a drip pan or other such device is provided to prevent spillage from migrating below the cook top. In spite of the numerous improvements that have been made in the design of such pans, the fact remains that spillage still reaches the underside of the cook top and inasmuch as such pans are normally made of metal, a good deal of heat is also transmitted to the space beneath the cook top.

According to the present invention, there is produced a support for a heating coil of a surface unit which normally prevents spillage from penetrating to beneath the cook top, and which also serves to reduce by a considerable amount the heat transmitted to the space beneath the cook top and thus provides a construction which is not only neater in appearance, and easier for a housewife to keep clean, but also one which has a substantial margin of safety over the older forms of support.

It is, therefore, a further object of the present invention to produce a support for a heating coil in a cook top which not only substantially prevents spillage penetration beneath the cook top, but also reduces the heat transmitted to such space and improves the over-all safety of the apparatus.

Other and further objects and advantages of the present invention will be readily apparent from the following description and drawings, in which:

FIG. 1 is a top plan view of a cook top including a support for a heating coil of the present invention;

FIG. 2 is a side elevational view of the apparatus of FIG. 1;

FIG. 3 is a vertical sectional view taken along line 3—3 of FIG. 1 with the heating element in place;

FIG. 4 is a view like FIG. 1 of a modified form of the invention;

FIG. 5 is a side elevational view of the apparatus shown in FIG. 4; and

FIG. 6 is a vertical section taken along line 6—6 of FIG. 4 with the heating element in place.

While this invention is susceptible of embodiment in many different forms, there is shown in the drawings and will herein be described in detail, an embodiment of the invention together with a modification thereof, with the understanding that the present disclosure is to be considered as an exemplification of the principles of the invention and is not intended to limit the invention to the embodiments illustrated. The scope of the invention will be pointed out in the appended claims.

Referring now to FIGS. 1–3 of the drawings, there is shown a cook top 10 provided with a circular aperture 11 in which is seated a support 12. The support is disc-like in shape and provided with an outer edge portion 13 overlying the cook top with the mating surfaces being flat so as to provide a seal to prevent liquid spilling onto the support 12 from running beneath the edge portion 13 and into the aperture 11. The support is provided with a portion 14 extending below the cook top and at its central portion with a spiral groove 15 matching in configuration the spiral of coil 16 so as to hold the same in a predetermined position.

The support 12 is made of refractory material such as, for example, ceramic material, and heat resistant glass such as Corning Glass Works' Pyroceram. Porcelain supports are also feasible for use.

The terminal ends 17 and 18 of the coil 16 extend at right angles to the general plane thereof and through holes 19 and 20 provided in the support 12. The terminal ends of the coil will, of course, be provided with the usual form of plug-in electrical connection to be received in a suitable connector positioned below the cook top. Thus, lifting the coil vertically upward will unplug it, while reinsertion in a downward direction will reestablish the electrical circuit. An integrally cast locating leg 21 on the support serves to determine the position thereof on the cook top for establishing such connection.

The modified form of the invention shown in FIGS. 4–6 are quite similar in construction and materials to those previously described. Referring to the latter figures, there is shown a cook top 30 provided with a circular aperture 31 in which is located a support 32 of refractory material having an outer edge portion 33 overlying the cook top and an inwardly depending portion 34 spaced inwardly of the edge of the aperture 31. In the central portion of the support 32 there is formed a recess 35 in which the coil 36 is positioned. The ends 37 and 38 of the coil extend downwardly through openings (one of which is indicated at 40) in the support 32. A locating leg 41 is also provided. Raised portions 45 and 46 surround the openings through which the terminal ends extend to act as dams so that spillage on top of the support will not be apt to run through the openings.

Extending radially outwardly from the center of the recess 35 are legs 42, 43 and 44, preferably integrally formed on and of the same material as the support 32. The legs support the coil slightly above the bottom of the recess 35 as illustrated in the drawings.

It is, of course, within the contemplation of the present invention that a compressible type seal or gasket could be provided between the outer edge portion and the cook top to provide a more secure seal therebetween and thus to ensure that spillage did not run beneath the cook top. Additionally, a twist type or bayonet lock may be provided on the support 12 and cook top 10 so that when the support is placed in position in the opening in the cook top, it may be rotated a few degrees to engage the portions of the lock on the support and the complementary portions on the cook top. After being locked in position, the terminal ends 17 and 18 of the heating element may be passed through the openings provided therefor and plugged into the recepatcle positioned below the top. When a bayonet or twist type lock is provided, of course, the locating leg 21 would be omitted.

We claim:
1. A heating apparatus for use as a surface unit on a cook top provided with a circular aperture therein comprising, a metallic sheath in the form of a self-supporting coil containing therein a resistance wire electrically insulated from the sheath by dielectric material therewithin, and means for removably supporting said coil on said cook top including a circular disc of refractory material having a diameter larger than the diameter of said aperture to cause the outer edge portion of the disc to overlie the cook top adjacent the aperture, said disc having an inner portion provided with a spiral groove conforming with said coil to receive and support the coil in predetermined position, said disc serving to substantially completely close the aperture.

2. A heating apparatus for use as a surface unit on a cook top provided with a circular aperture therein comprising, a metallic sheath in the form of a self-supporting coil containing therein a resistance wire electrically insulated from the sheath by dielectric material therewithin, and means for removably supporting said coil on said cook top including a circular disc of refractory material having a diameter larger than the diameter of said aperture to cause the outer edge portion of the disc to overlie the cook top adjacent the aperture, said disc having an inner portion which is recessed and provided with a plurality of radially extending legs integrally formed in said disc for supporting the coil in predetermined position and said disc serving to substantially completely close the aperture.

References Cited by the Examiner

UNITED STATES PATENTS

| | | | |
|---|---|---|---|
| 1,431,407 | 10/1922 | McClatchie | 219—467 X |
| 1,522,206 | 1/1925 | Rankin | 219—467 X |
| 1,523,626 | 1/1925 | Armstrong | 219—467 |
| 1,527,232 | 2/1925 | Smith | 219—467 X |
| 2,179,934 | 11/1939 | Jones | 219—464 X |
| 2,799,765 | 7/1957 | Jenkins et al. | 219—464 X |
| 2,870,316 | 1/1959 | Ferguson | 219—464 X |
| 2,953,670 | 9/1960 | Kelly | 219—455 |

RICHARD M. WOOD, Primary Examiner.

L. H. BENDER, Assistant Examiner.